June 18, 1957 W. R. SMITH 2,795,914
POWER MOWER WITH ROTATING CUTTER BAR AND REVERSING MEANS
Filed Oct. 14, 1953 5 Sheets-Sheet 1
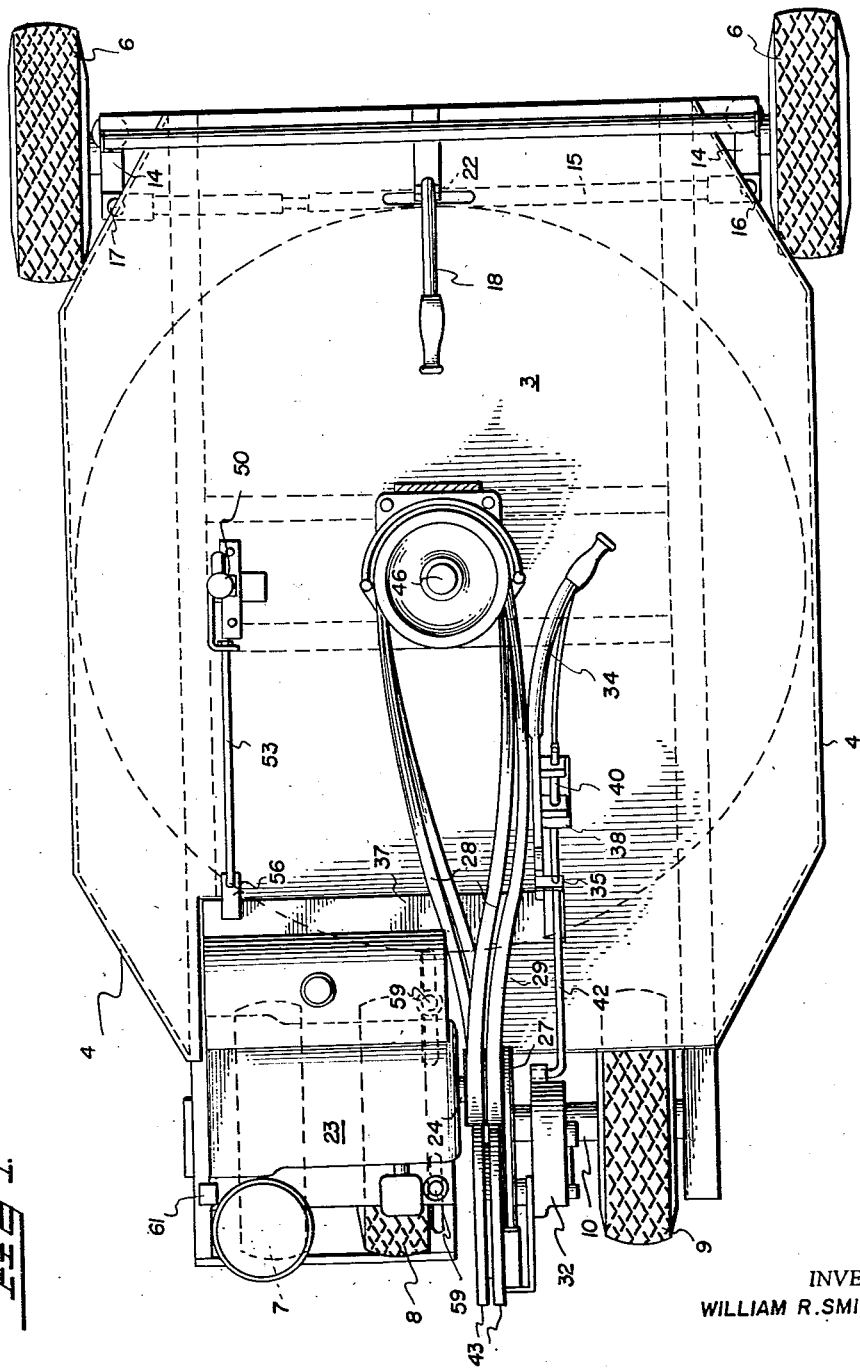
INVENTOR
WILLIAM R. SMITH.
BY K. Wilson Corder
ATTORNEY

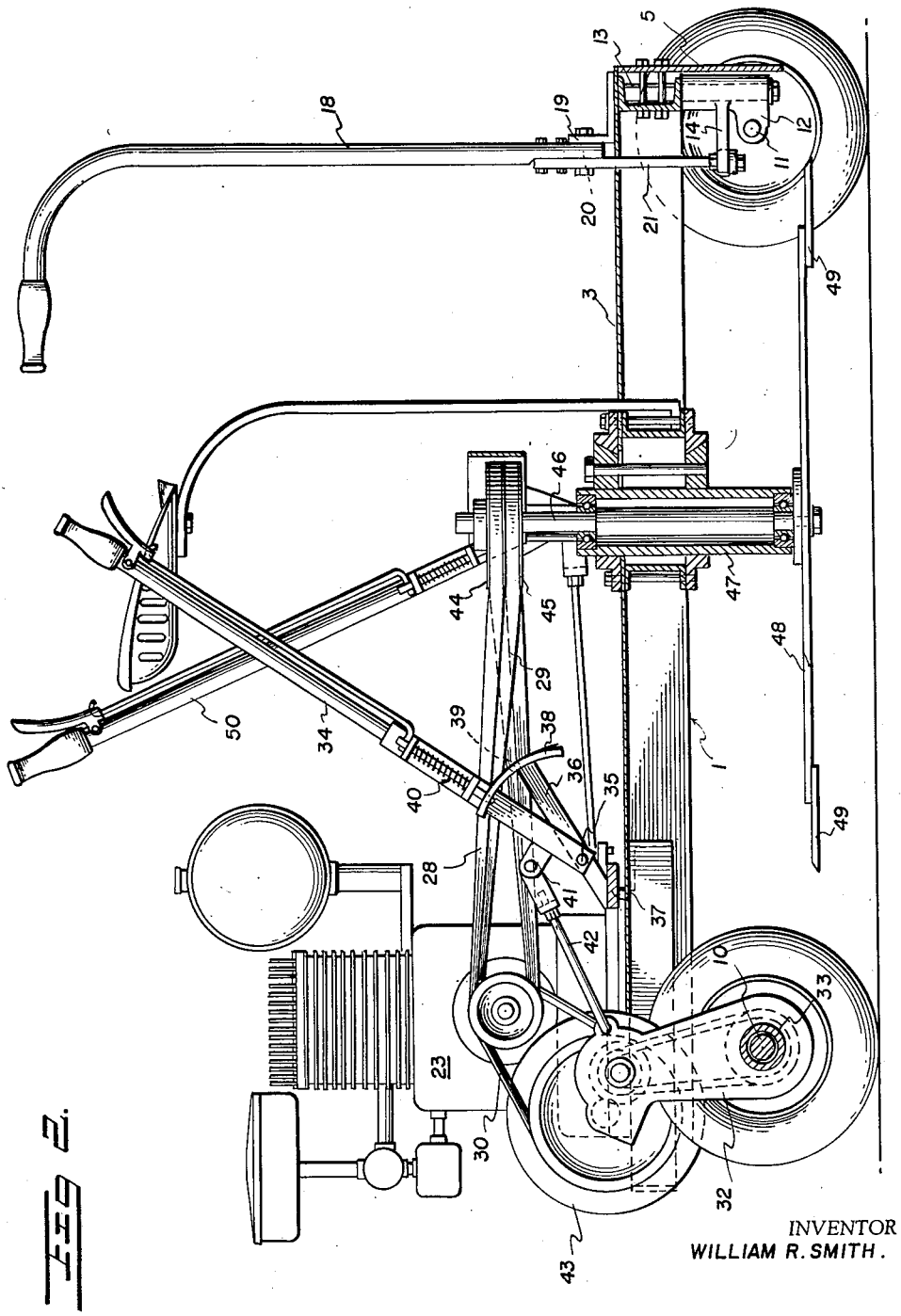

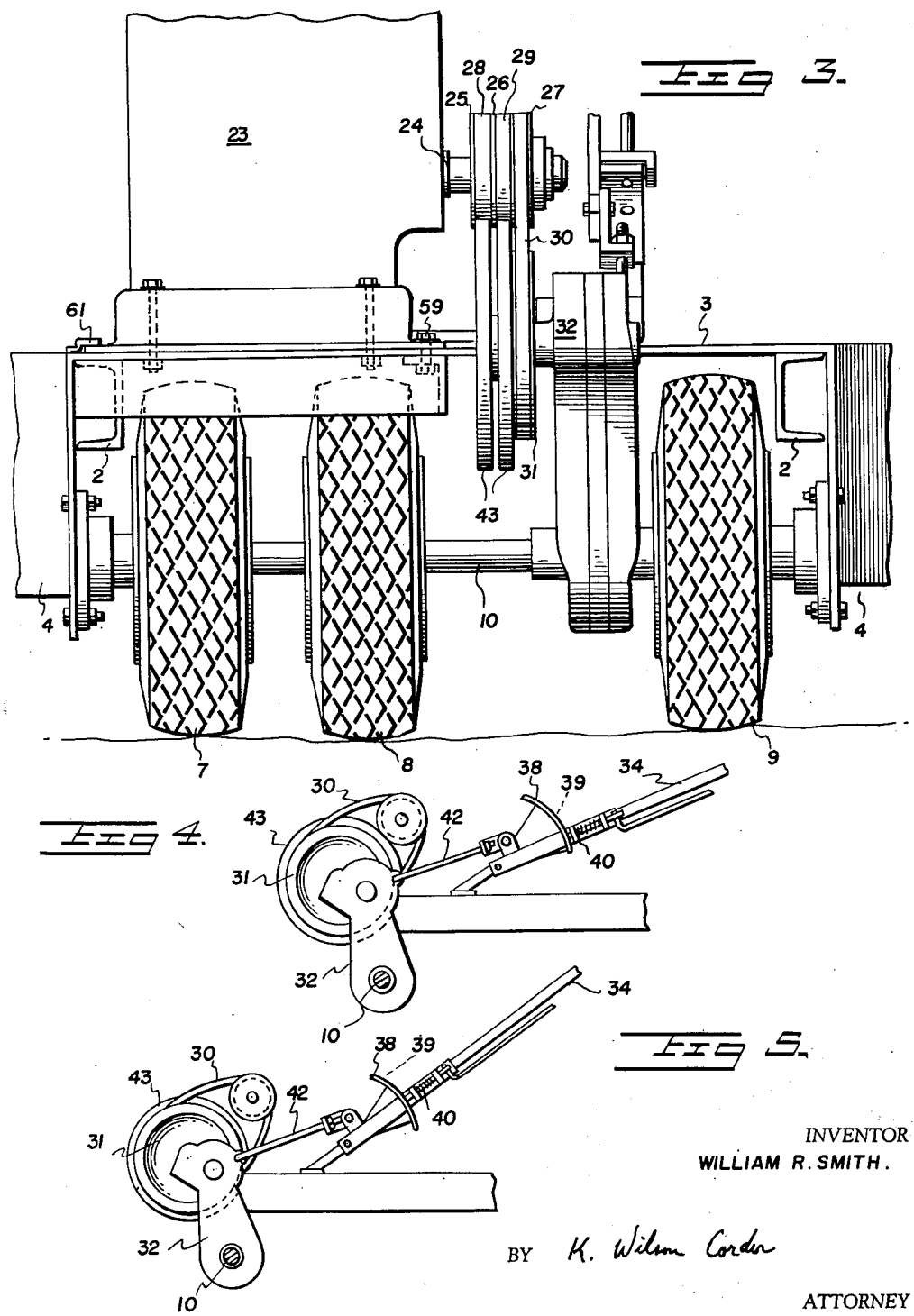

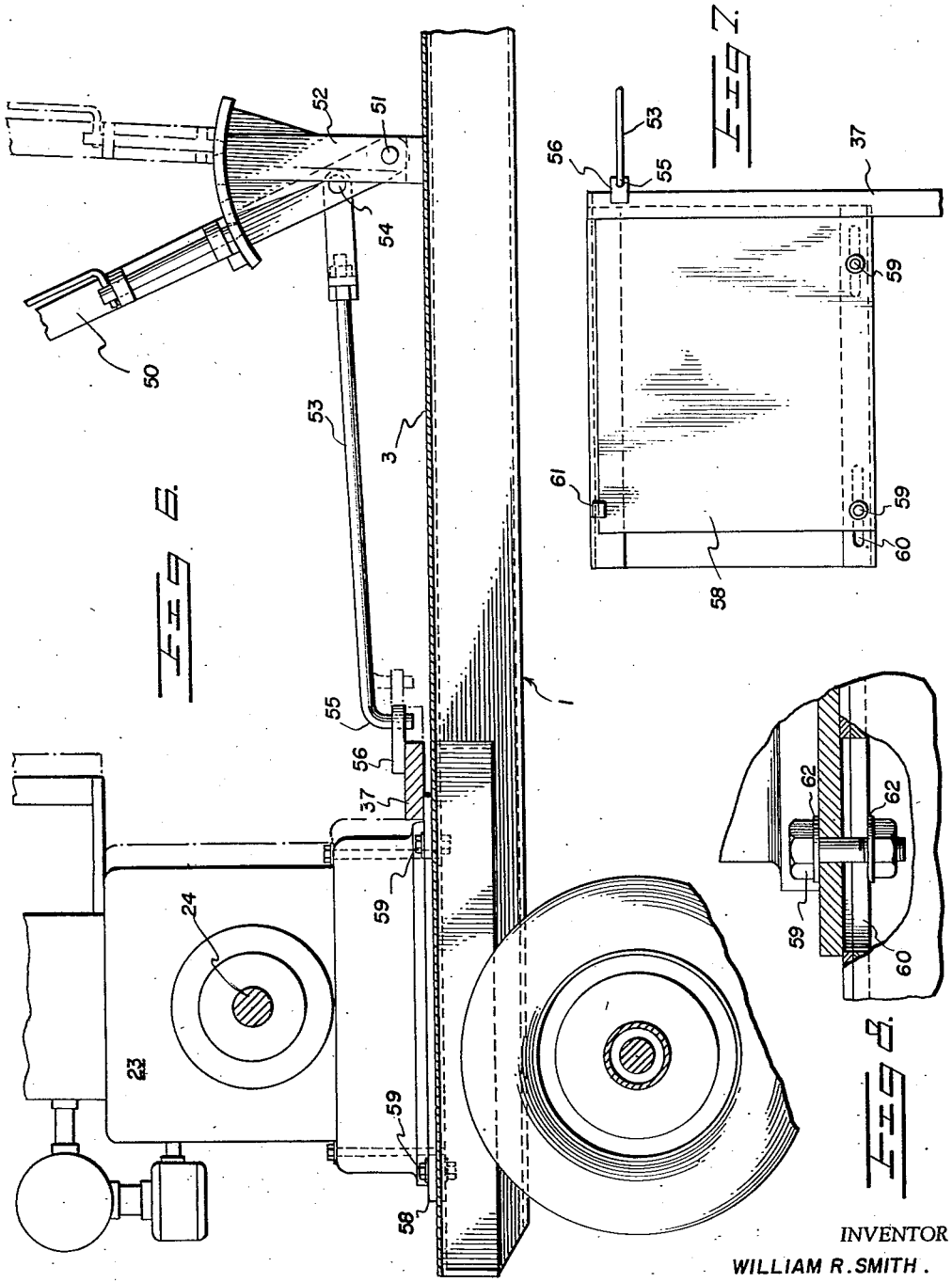

June 18, 1957 W. R. SMITH 2,795,914
POWER MOWER WITH ROTATING CUTTER BAR AND REVERSING MEANS
Filed Oct. 14, 1953 5 Sheets-Sheet 5

INVENTOR
WILLIAM R. SMITH.

BY K. Wilson Corder

ATTORNEY

United States Patent Office 2,795,914
Patented June 18, 1957

2,795,914

POWER MOWER WITH ROTATING CUTTER BAR AND REVERSING MEANS

William R. Smith, Atlanta, Ga.

Application October 14, 1953, Serial No. 385,906

4 Claims. (Cl. 56—25.4)

This invention relates to a power mower and more particularly to a new and improved power mower built on a substantial scale and contemplated to be used in the cutting of grass, weeds and the like in parks, large estates, institutions, cemeteries and other places having lawns where extensive mowing operations are required.

The present invention is directed to the problem of providing a power mower which has a cutting width making it practicable for use in extensive mowing but which is nevertheless easy to operate and smooth and efficient when in operation. Generally, the larger a power mower is the more difficult it is to use and maneuver. Since many places where extensive mowing is required have numerous obstacles of which the mower must avoid, it is apparent that the ability of the mower to change direction, go forward, reverse or stop smoothly and rapidly is an important factor in achieving superior performance.

Other important factors are ruggedness and power, and ease in making adjustments to adapt the mower to different cutting requirements. Ruggedness and power enable the mower to perform on uneven terrain. Ease in adjustment includes being able to vary the cutting height of the mower quickly and easily.

It is therefore an object of the present invention to provide a new and improved power mower which is rugged and powerful and yet is easy to operate and smooth and efficient when in operation.

It is another object of the present invention to provide such a mower which can get into motion or change direction quickly and smoothly.

It is a further object of the present invention to provide such a mower wherein the cutting height can be varied quickly and easily.

Briefly described, a preferred embodiment of the present invention is a rotary mower having a 36" swath. The mower comprises a chassis, including a platform, supported on five pneumatic tires, two at the front and three at the rear. An internal combustion engine is slidably mounted on the platform substantially directly above the rear axle. A substantially vertical shaft extends through the platform in the forward portion of the platform and terminates in a substantially horizontal cutter bar which carries the cutter blades.

Three pulleys or sheaves are mounted on the engine shaft and furnish power for driving both the machine and the cutter blades. One pulley carries a belt which engages a pulley on a transmission unit. The transmission unit is pivotally mounted on the rear axle and by means of an operating lever, the operator can rock the transmission unit to cause forward or reverse movement of the mower, or can position the transmission unit in neutral. The other two pulleys on the engine shaft carry belts which engage two pulleys mounted on the upper end portion of the cutter blade shaft. By means of another control lever the operator can slide the engine rearwardly on the platform to tighten the belts and drive the cutter blades or to slack off the belts and disengage the cutter blade drive. When the engine is moved the transmission unit is also rocked so that proper spacing of the transmission unit with respect to the engine shaft is maintained whether or not the cutter blades are being driven.

The front wheels of the machine are mounted on caster brackets and are turned by means of a tiller bar. As a further aid in turning, the middle rear wheel is inflated more than the end wheels so that the mower turns essentially on two wheels.

Other objects and advantages of the present invention will become more apparent from the following detailed description taken in conjunction with the attached drawings in which:

Fig. 1 is a top plan view of a preferred embodiment of a power mower constructed in accordance with the teaching of the present invention;

Fig. 2 is a side elevational view, partly in section, of said embodiment;

Fig. 3 is an enlarged fragmentary rear elevational view of said embodiment;

Fig. 4 is a reduced fragmentary side elevational view showing the position of certain components of the mower when the mower is being run in reverse;

Fig. 5 is a view similar to Fig. 4 showing position of said components when the mower drive is in neutral;

Fig. 6 is an enlarged detail elevational view, with parts broken away and shown in section, showing the slidable engine mounting and the means for causing said mounting to slide;

Fig. 7 is a detail plan view of the slidable engine mounting;

Fig. 8 is an enlarged detail view, partly in section, showing means for slidably connecting the engine base to the mower platform;

Figure 10:
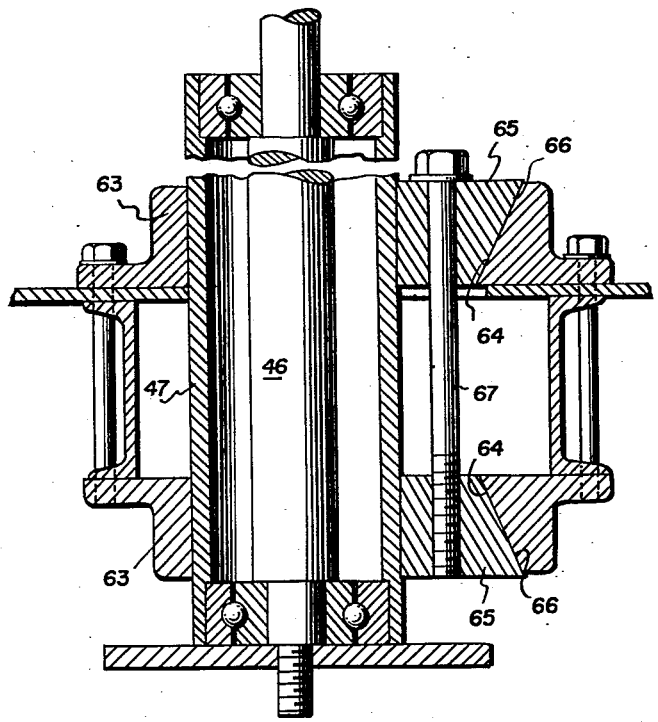
Fig. 10 is a sectional elevational view taken on line 10—10 of Fig. 9.

The preferred embodiment of the present invention illustrated in the drawings comprises a chassis, indicated generally by the reference numeral 1, which includes longitudinally extending frame members 2 which support a substantially horizontal platform or deck 3 made preferably of suitable heavy gauge metal. Platform 3 is provided with side skirts 4 and a front skirt 5 which depend from the platform and suitably enclose the cutter blade structure described hereinafter.

The frame and platform structure just described is supported on five wheels. Two of these wheels 6 are front wheels and the other three wheels 7, 8 and 9 are rear wheels. The three rear wheels are mounted on a common rear axle 10 while each of the front wheels is mounted on a stub axle 11 of a caster bracket 12, the latter being pivotally mounted on a kingpin 13. Each of the caster brackets has a rigid arm or extension 14 projecting rearwardly therefrom, as shown in Figs. 1 and 2. An adjustable length tie rod 15 is pivotally connected to said arms 14 at 16 and 17 so that longitudinal movement of said tie rod will cause simultaneous pivoting of the caster brackets about kingpins 13 and will consequently cause simultaneous turning of the front wheels 6.

Steering is accomplished by a tiller bar 18 which is pivotally mounted at 20 to an upstanding bracket 19 located on platform 2. The tiller bar has a downwardly extending arm 21 which is pivotally connected at 22 to tie rod 15 in such fashion that when the tiller bar is swung either to the right or left about pivot 20 it will cause longitudinal movement of tie rod 15 and consequent turning of the front wheels 6. This arrangement provides rapid and easy turning of the front wheels and enables the operator to keep the mower under positive control without exerting undue effort.

As a further aid in turning, the rear wheel 8 has a slightly larger circumference than the rear wheels 7 and 9 and is located with respect to the center of gravity of the mower so that when the mower turns to either the right or left it will turn essentially on two wheels instead of three. Thus, assuming that the mower is turning to the right, rear wheel 9 will be slightly clear of the ground and will thus not scuff the turf. This is in the nature of a differential action. All of the wheels 6–9 are preferably fully pneumatic rubber tires which will adequately support the weight of the mower without damage to a lawn.

Power for driving the mower and for actuating the cutter blades is supplied by an engine designated generally by the reference numeral 23. This engine will preferably be an internal combustion engine. Engine 23 has a projecting drive shaft 24 on which are mounted three pulleys or sheaves 25, 26 and 27. Sheaves 25 and 26 carry belts 28 and 29 which drive the cutter blades in a manner described hereinafter. Sheave 27 carries a belt 30 which also engages a larger sheave or pulley 31 mounted downwardly behind and below sheave 27 as shown in Figs. 1–3.

Pulley 31 furnishes input to a transmission unit indicated generally by the reference numeral 32. This transmission unit 32 is rockably or pivotally supported on rear axle 10, as indicated at 33 in Fig. 1, and is adapted to transmit power from pulley 31 to rear axle 10 when pulley 31 is turned by belt 30. Further details concerning transmission 32 are omitted since it is not per se the present invention. Instead, reference is made to U. S. Patent No. 2,513,685 since transmission 32 is of the type disclosed in said patent.

Rocking or pivoting of transmission unit 32 about rear axle 10 is caused by movement of an upwardly extending hand grasped lever 34. The lower end of lever 34 is pivotally connected at 35 to an upwardly extending arm or bracket 36 which, in turn, is fixedly connected to a substantially horizontal bar-like base 37. Arm 36 has a fixed curved plate or quadrant member 38 positioned at its upper end. Plate 38 has openings 39 therein which cooperate with suitable detent means, indicated generally by the reference numeral 40, to maintain lever 34 in a selected position with respect to arm 36.

Another arm 41 extends from the lower end portion of lever 34 and is pivotally connected to a link 42 which is, in turn pivotally connected to transmission unit 32. It is apparent therefore that when lever 34 is pivoted about pivot 35, link 42 is caused to advance or retract and thus moves or rocks transmission unit 32 about rear axle 10. Fig. 2 shows lever 34 in its uppermost position. In this position, link 42 and hence transmission unit 32 are in their rearmost position. When the transmission unit is in this position, pulley or sheave 31 tightens belt 30 sufficiently to permit this belt to transmit power from engine shaft 24. Pulley 31 is driven in a counterclockwise direction as viewed in Fig. 2 and through transmission unit 32 imparts clockwise direction to rear axle 10, thus causing forward movement of the mower.

In order to reverse the mower, lever 34 is moved to its lowermost position as shown in Fig. 4. When lever 34 is in this position, link 42 and transmission unit 32 are in their most advanced or forward position. Belt 30 is slack on pulley or sheave 31 and consequently does not transmit power to this pulley. However, the shaft which carries pulley 31 also carries two larger disks 43 mounted side by side, as shown in Fig. 3, and spaced so that they can engage belts 28 and 29 carried by sheaves 25 and 26 when the disks are advanced toward these belts. The positioning is such that when lever 34 is in its lowermost position, as shown in Fig. 4, the peripheral edges of disks 43 are pressed into engagement with belts 28 and 29 and are consequently turned in a clockwise direction. Motion of the disks 43 is transmitted to rear axle 10 through transmission unit 32 to cause the rear axle to rotate in a counter-clockwise direction, as viewed in Fig. 2, and thus cause the mower to run in reverse. In order to facilitate maintaining control over the mower when it is run in reverse, detent 40 is not engaged in an opening 39 in quadrant 38. Instead, the operator holds the lever down and can thus release it almost instantly should he desire to stop reverse movement of the mower. This is a safety feature.

When lever 34 is in the intermediate position shown in Fig. 5, belt 30 is still slack enough on pulley 31 so that power is not transmitted to the transmission unit by this pulley and the peripheral edges of disks 43 are spaced from belts 28 and 29 so that power is not transmitted to the transmission unit by these disks. There is therefore substantially no power input to transmission unit 32 and the mower is thus in neutral.

In order to cause rotation of the cutter blades, belts 28 and 29 engage pulleys or sheaves 44 and 45 mounted substantially horizontally on the upper end portion of an upright shaft 46 as shown in Fig. 2. Shaft 46 is surrounded for a portion of its length and supported by a housing 47 in which the shaft is suitably journaled for rotation. A substantially horizontal cutter bar 48 is connected to the lower end of the shaft and carries cutter blades 49 which are attached to the cutter bar by any suitable means.

Rotation of shaft 46, and hence rotary movement of the cutter blades 49, is caused by movement of an upwardly extending hand grasped lever 50. This lever has its lower end pivotally connected at 51 to an upstanding arm or bracket 52 mounted on platform 3. A link 53 is pivotally connected at 54 to the lower end portion of lever 50 and this link has a downturned end 55 which engages a lug 56 fixedly connected to bar 37, as shown more particularly in Figs. 6 and 7. Bar 37 is in turn fixedly connected to a bottom plate 58 upon which engine 23 is mounted. Plate 58 is in turn slidably mounted on platform 3, being positioned for sliding movement with respect to the platform by means of bolts 59 which pass through elongated slots 60 in the platform and by means of a hold-down lug 61 which laps over and is spaced slightly above an edge of plate 58 as shown in Fig. 3. Bolts 59 are of course provided with suitable washers 62 which prevent slidable plate 58 from being pulled up from platform 3 but nevertheless have sufficient looseness with respect to the walls of slots 60 to permit the plate to slide longitudinally when sufficient power is applied to it to cause it to slide.

It is apparent from the foregoing description that movement of lever 50 causes, through link 53, longitudinal or sliding movement of plate 58 with respect to platform 3. The positioning is such that when lever 50 is in its rearmost position, i. e. the solid line position shown in Fig. 6, plate 58 and hence engine 23 are also in their rearmost position. When they are in this position, pulleys or sheaves 25 and 26 are tightened against belts 28 and 29 to a sufficient extent to cause these belts to transmit motion from engine 23 to the upright cutter blade shaft 46 and consequently rotate this shaft. Conversely, when lever 50 is in its forward position, i. e. the position indicated in dot-dash lines in Fig. 6, plate 58 and engine 23 are likewise in forward position. When the engine is in this position, belts 28 and 29 are slacked off to such an extent that there is substantially no power supplied by the engine to the cutter blade shaft 46.

It will be noted that horizontally extending bar 37 supports the upstanding arm or bracket 36 which carries hand lever 34. Consequently, when lever 50 is actuated to engage or disengage the cutter blade drive, lever 34, link 42 and transmission unit 32 are all also moved, the direction of movement depending of course upon the direction of movement of lever 50. The reason for this is to preserve the relative positioning or spacing of the pulley 31 and disks 43 with respect to engine shaft 24 so that the mower can be run forward, in reverse, or be in neutral whether or not the cutter blades are rotating.

Figure 9:
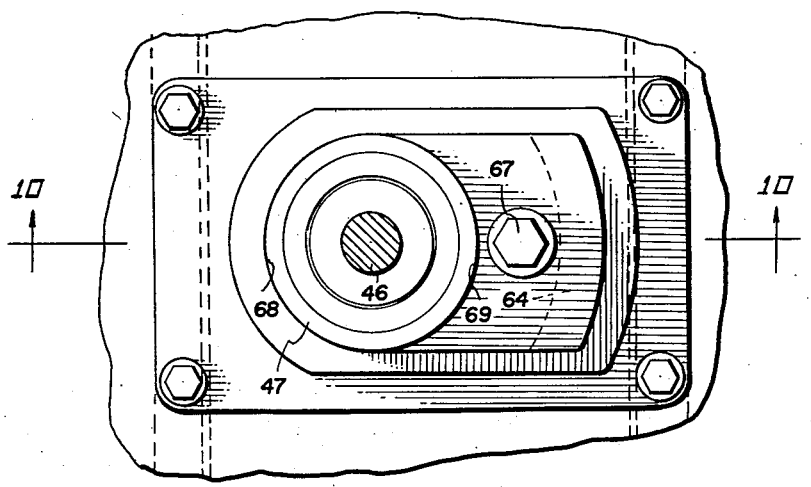
Fig. 9 is a top plan view of a preferred arrangement for adjustably supporting the cutter blade shaft.

The cutting height or distance of cutter blades 49 above the ground is readily varied by virtue of the mounting arrangement for supporting the housing 47 for cutter blade shaft 46. This arrangement is shown more particularly in Figs. 9 and 10, wherein it is seen that housing 47 is surrounded by a pair of oppositely disposed upper and lower elongated collars or bushings 63. Each of the collars 63 has an inwardly facing inclined face 64 thereon. Each inclined face 64 is preferably concavely curved as shown in Fig. 10 and the faces are symmetrically disposed as shown in Fig. 9 to cooperate with a pair of collets or curved wedges 65 which have outer faces 66 of corresponding convex curvature to the faces 64. Wedges 65 are held in firm engagement with collars or bushings 63 and housing 47 by a suitable means such as a headed bolt 67, which preferably passes through one wedge and is threaded into the other as shown in Fig. 9.

It is apparent from the foregoing description that loosening of bolt 67 permits wedges 65 to be loosened from tight engagement with housing 47. This housing can then be raised or lowered to the desired extent and held in adjusted position until bolt 67 is again tightened. When the bolt is tightened, curved inclined faces 64 engage curved inclined faces 66 and the latter urge or cam the wedges into tight engagement with housing 47. It will be noted from Fig. 10 that the housing is gripped circumferentially since the collars have semi-circular faces 68 and the wedges have semi-circular faces 69. This results in a strong grip on the housing.

From the foregoing description it is seen that the present invention provides a rugged and powerful rotary mower having especial utility for cutting lawns in such places as parks, cemeteries, etc. where numerous obstacles have to be avoided. The conveniently placed levers 34 and 50 enable the operator to quickly and readily control motion of the mower and motion of the cutter blades. Steering is readily accomplished by means of the tiller bar 18 and the rear wheel arrangement.

In describing the cutter blade drive, I have shown and described two pulleys 25 and 26 on the engine drive shaft carrying two belts 28 and 29 which engage two pulleys 44 and 45 mounted on the outer blade drive shaft. While this is a preferred arrangement, it may be desired to provide only one pulley on the engine drive shaft and only one belt which engages only one pulley mounted on the cutter blade drive shaft. I have also described cutter blades 49 as being attached to a cutter bar 48 which is connected to the lower end of the drive shaft 46. However, the cutter bar and blades, considered as a unit, can be described broadly as being a cutter blade.

Accordingly, while I have described and illustrated a preferred embodiment of my invention, I wish it to be understood that I do not intend to be restricted solely thereto but that I do intend to cover all modifications therefor which would be apparent to one skilled in the art and which come within the spirit and scope of my invention.

What I claim as my invention is:

1. A rotary power mower comprising a rear axle, a frame supported on said rear axle, a deck on said frame, a cutter bar shaft positioned forwardly of said rear axle and extending through said deck, means carried by said deck rotatably supporting said shaft in upright position with respect to said deck, a cutter bar connected to the lower end of said shaft, a pulley mounted on said shaft above said deck, an engine positioned rearwardly of said cutter bar shaft, means carried by said deck supporting said engine for sliding movement on said deck between a forward position and a rearward position and vice versa, a drive shaft projecting from said engine, a pulley mounted on said drive shaft, a belt trained about said drive shaft pulley and said cutter bar shaft pulley, said belt being taut when said engine is in its rearward position and being slack when said engine is in its forward position whereby said cutter bar is driven by said engine only when said engine is in its rearward position, a transmission unit connected to said rear axle for pivotal movement with respect to said rear axle, transmission unit pivoting means connected to said transmission unit, means on said engine support carrying said pivoting means whereby said pivoting means moves in response to sliding movement of said engine support, said transmission unit being movable pivotally in response to movement of said pivoting means caused by sliding movement of said engine support, said transmission unit also being movable independently of movement of said engine support from a forward drive position to a reverse drive position and vice versa, and said transmission unit pivoting means being movable independently of movement of said engine support from a forward position to a rearward position to move said transmission unit from its forward drive position to its reverse drive position and being movable from a rearward position to a forward position to move said transmission unit from its reverse drive position to its forward drive position whereby said mower may be driven in forward or reverse irrespective of whether said cutter bar is being driven.

2. A rotary power mower according to claim 1 wherein said transmission unit has a neutral drive position located between its forward drive position and its reverse drive position and is movable from both its forward drive position and its reverse drive position to said neutral drive position, and said transmission unit pivoting means is movable independently of movement of said engine support from both the forward position of said pivoting means and the rearward position of said pivoting means to move said transmission unit to its neutral drive position whereby said mower may be driven in forward or reverse, or be in neutral, irrespective of whether said cutter bar is being driven.

3. A rotary power mower comprising a rear axle, a frame supported on said rear axle, a deck supported on said frame, a shaft positioned forwardly of said rear axle and extending through said deck, means carried by said deck rotatably supporting said shaft in upright position with respect to said deck, a cutter bar connected to the lower end of said shaft, an engine positioned adjacent said rear axle, means on said deck supporting said engine for sliding movement between an extreme forward position and an extreme rearward position, a drive shaft projecting from said engine, means extending between and connecting said drive shaft and said upright shaft to transmit power from said drive shaft to said upright shaft when said engine is in its extreme rearward position, said connecting means being ineffective to transmit power from said drive shaft to said upright shaft when said engine is in its extreme forward position, movable transmission means interposed between said engine drive shaft and said rear axle, means connected to said rear axle supporting said transmission means for movement from a forward drive to a reverse drive position and vice versa, a movable control lever connected to said transmission means, means on said slidable engine support supporting said control lever for movement with said engine support, said control lever connection to said transmission unit moving said transmission means in response to sliding movement of said engine support, and said control lever being independently movable when said engine support is at rest to move said transmission means from its forward drive position to its reverse drive position and vice versa whereby said mower may be driven in a forward or reverse direction irrespective of whether said cutter bar is being driven.

4. A rotary power mower comprising a rear axle, a frame supported on said rear axle, a deck on said frame, a cutter bar shaft positioned forwardly of said rear axle and extending through said deck, means carried by said deck rotatably supporting said shaft in upright position with respect to said deck, a cutter bar connected to the lower end of said shaft, a pulley mounted on said shaft above said deck, an engine positioned rearwardly of said cutter bar shaft, an engine base plate, means connecting said base plate to said deck to permit said base plate to slide on said deck between a forward position and a rearward position and vice versa, a drive shaft projecting from said engine, a pulley mounted on said drive shaft, a belt trained about said drive shaft pulley and said cutter bar shaft pulley, said belt being taut when said engine is in its rearward position and being slack when said engine is in its forward position whereby said cutter bar is driven by said engine only when said engine is in its rearward position, a transmission unit, means supporting said transmission unit on said rear axle to permit said transmission unit to rock with respect to said rear axle, a transmission unit control lever having its lower end positioned adjacent the upper surface of said deck, said control lever extending upwardly with respect to said deck, an extension on said engine base plate, means pivotally connecting the lower end of said control lever to said extension, said extension carrying said control lever whereby said control lever is moved as said engine is moved, a link extending between said transmission unit and said control lever, said link being pivotally connected at one end to said transmission unit and being pivotally connected at its other end to said control lever, the pivotal connection between said link and said control lever being located above the pivotal connection between said control lever and said engine plate extension whereby pivotal movement of said control lever causes longitudinal movement of said link, said transmission unit being rockable in response to movement of said link caused by sliding movement of said engine base plate, said transmission unit also being rockable independently of movement of said engine base plate from a forward drive position to a reverse drive position and vice versa, and said control lever being movable independently of movement of said engine base plate from a forward position to a rearward position to rock said transmission unit from its forward drive position to its reverse drive position and being movable from a rearward position to a forward position to rock said transmission unit from its reverse drive position to its forward drive position whereby said mover may be driven in forward or reverse irrespective of whether said cutter bar is being driven.

References Cited in the file of this patent
UNITED STATES PATENTS

| | | |
|---|---|---|
| 950,728 | Prevot | Mar. 1, 1910 |
| 1,859,183 | Silfies | May 17, 1932 |
| 2,427,132 | Godbey | Sept. 9, 1947 |
| 2,474,085 | Albright | June 21, 1949 |
| 2,504,268 | Lee | Apr. 18, 1950 |
| 2,513,685 | Smith et al. | July 4, 1950 |
| 2,543,147 | Boor et al. | Feb. 27, 1951 |
| 2,549,317 | Laughlin | Apr. 17, 1951 |
| 2,585,405 | Reiter | Feb. 12, 1952 |
| 2,604,747 | Bash | July 29, 1952 |
| 2,691,421 | Swanson | Oct. 12, 1954 |
| 2,714,934 | Cassady | Aug. 9, 1955 |